United States Patent
Huang et al.

(10) Patent No.: US 10,367,571 B2
(45) Date of Patent: *Jul. 30, 2019

(54) METHOD FOR TRANSMITTING DATA IN WIRELESS SYSTEM

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW); Yung-She Lin, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 46 days.

This patent is subject to a terminal disclaimer.

(21) Appl. No.: 15/810,350

(22) Filed: Nov. 13, 2017

(65) Prior Publication Data

US 2019/0149219 A1    May 16, 2019

(51) Int. Cl.
  *H04B 7/155*   (2006.01)
  *H04W 76/10*  (2018.01)
  (Continued)

(52) U.S. Cl.
  CPC .......... *H04B 7/155* (2013.01); *H04W 76/10* (2018.02); *H04W 76/20* (2018.02); *H04W 84/12* (2013.01)

(58) Field of Classification Search
  None
  See application file for complete search history.

(56) References Cited

U.S. PATENT DOCUMENTS 9,985,947 B1 *   5/2018   Elhard ................... H04L 63/08
2007/0297391 A1   12/2007   Furukawa et al.
(Continued)

FOREIGN PATENT DOCUMENTS

TW   201615026 A   4/2016

OTHER PUBLICATIONS

Examination report for TW106126322, dated Jun. 20, 2018, Total of 6 pages.

(Continued)

*Primary Examiner* — Christine T Duong
(74) *Attorney, Agent, or Firm* — Lynette Wylie; Apex Juris, PLLC.

(57) ABSTRACT

A method for transmitting data in a wireless system, wherein the wireless system includes a server, a relay device, and at least one appliance. The method includes that the relay device is connected to the server through an internet; determine whether there is a state information sent from the appliance being stored in the relay device; if so, send the state information to the server; otherwise, send a first interactive command to the server, wherein the first interactive command corresponds to a situation that there is no state information being stored in the relay device; send a second interactive command to the server, and then interrupt a connection with the server, wherein the second interactive command requests the server to interrupt a connection with the relay device. Whereby, the server could determine whether the relay device transmits data normally or not, ensuring the reliability of data transmission.

16 Claims, 9 Drawing Sheets

(51) Int. Cl.
  *H04W 76/20* (2018.01)
  *H04W 84/12* (2009.01)

(56) References Cited

U.S. PATENT DOCUMENTS

| | | |
|---|---|---|
| 2011/0176483 A1 | 7/2011 | Palanki |
| 2015/0009022 A1* | 1/2015 | Cho ................... G08C 17/02 340/12.53 |
| 2017/0208038 A1* | 7/2017 | Hinaman ............ H04L 63/0272 |

OTHER PUBLICATIONS

Search report for TW106126322, dated Jun. 20, 2018, Total of 1 page.
English abstract for TW201615026, Total of 1 page.

* cited by examiner

METHOD FOR TRANSMITTING DATA IN WIRELESS SYSTEM

BACKGROUND OF THE INVENTION

1. Technical Field

The present invention relates generally to a wireless system, and more particularly to a method for transmitting data in a wireless system.

2. Description of Related Art

A remote control is a commonly seen component in present days to operate a home appliance wirelessly from a short distance. Typically, one remote control is matched with one home appliance in a one-to-one relation, which means that each home appliance has a specific remote control to control it. Therefore, with more home appliances in a home, there would be more remote controls to be placed. Furthermore, home appliances of the same type usually have similar looking remote controls, which may confuse the user.

In light of this, a remote control system having a relay device is developed, which allows the user to access the system with an electronic device such as a computer or a mobile phone through a network. Within such a remote control system, the user could input a command on an electronic device, and this command would be then transmitted to the relay device. Upon receiving the command, the relay device would convert it into a control signal, and transmit the control signal to a specific home appliance. In this way, the user is able to control various home appliances with one single electronic device as a remote control.

In recent years, with advantages in cloud technology, the relay device can be connected to a server through an Internet, whereby to send a state information of the home appliance from the relay device to the server for subsequent use. However, the server cannot determine whether the relay device sends the state information or not when the data is lost in the Internet transmission process. In all aspects, the conventional data transmission still has room for improvements.

BRIEF SUMMARY OF THE INVENTION

In view of the above, the primary objective of the present invention is to provide a method for transmitting data in a wireless system, which may ensure the reliability of the data transmission.

The present invention provides a method for transmitting data in a wireless system, wherein the wireless system includes a server, a relay device, and at least one appliance, wherein the server and the relay device are connected to an internet respectively. The relay device is wirelessly connected to the at least one appliance, and is adapted to receive and store a state information of the at least one appliance. The method including the steps of: A. connect to the server by the relay device through the internet, which is adapted for the relay device and the server transmit data to each other; B. determine whether the relay device is stored with the state information sent from the at least one appliance; if so, send the state information to the server by the relay device; otherwise, send a first interactive command to the server by the relay device, wherein the first interactive command corresponds to a situation that the relay device is not stored with any state information of the at least one appliance; C. send a second interactive command to the server, and then interrupt a connection between the relay device and the server, wherein the second interactive command requests the server to interrupt the connection with the relay device.

Therefore, the relay device could send the first interactive command to the server even there is no state information being stored in the memory. In this way, the server could determine whether the relay device transmits data normally or not, ensuring the reliability of data transmission.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
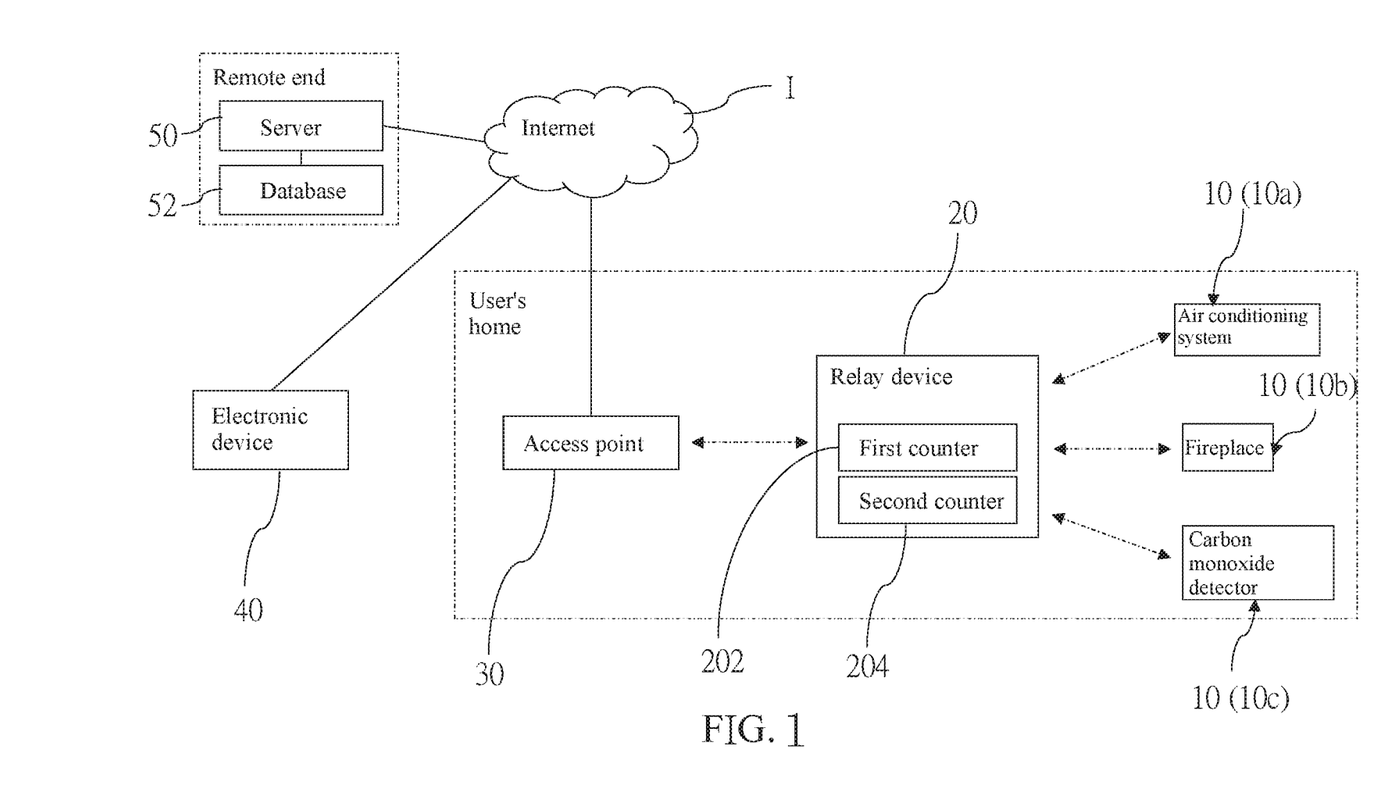
FIG. 1 is a schematic block diagram of the wireless system of a first embodiment of the present invention.

A wireless system of a first embodiment of the present invention is illustrated in FIG. 1, including at least one appliance 10, a relay device 20, an access point 30, an electronic device 40, and a server 50.

In the current embodiment, the wireless system includes a plurality of appliances 10 which are located at a user's home, wherein the appliances 10 include two controllable appliances and one detection appliance. In the current embodiment, the controllable appliances are an air conditioning system 10a and a fireplace 10b as an example, and the detection appliance is a carbon monoxide detector 10c as an example. Each of the appliances 10 is wirelessly connected to the relay device 20 via a radio frequency signal (i.e., RF signal). However, the RF signal is not a limitation of the present invention. Other wireless signals such as Wi-Fi, Zigbee, Bluetooth, infrared, etc, also could be utilized. The controllable appliances are configured to receive a control command and perform an action corresponding to the control command (e.g. power on/off, adjusting temperature, etc.). A state information of each of the controllable appliances is compiled into an RF signal to be transmitted then, wherein the state information may include a status of being on/off, a current temperature, an error code, etc. Also, a state information of the detection appliance is compiled into an RF signal to be transmitted, wherein the state information may include a physical quantity measured by the detection appliance (e.g. concentration of carbon monoxide).

The relay device 20 is at the user's home and is wirelessly connected to the access point 30 via a Wi-Fi signal, whereby to be connected to an internet I. The relay device 20 is adapted to receive an RF/Wi-Fi signal, and convert the received RF/Wi-Fi signal into a corresponding Wi-Fi/RF signal to be sent out. Also, the relay device 20 is adapted to receive the RF signal including the state information from the appliances 10, and to interpret the received RF signal to obtain the corresponding state information, and the corresponding state information is stored into a memory (not shown). In addition, the relay device 20 has a first counter 202 and a second counter 204, which will be described in detail later.

In the current embodiment, the electronic device 40 is a tablet as an example, which could be connected to the Internet I or the access point 30. The electronic device 40 has a built-in application, which is adapted for a user to input control commands (e.g. power on/off, adjusting temperature, etc.) of the appliances 10. The user could assign one of the appliances 10 to be controlled via the application of the electronic device 40. When the electronic device 40 is connected to the Internet I, the control commands inputted by the user could be sent to the server 50 through the Internet I. Said control commands include an identification code of the relay device 20, at least one device code corresponding to the at least one appliance 10, and command codes (e.g. powering on or off, adjusting temperature, and other operations all have a corresponding command code), whereby to assign the relay device 20 or the to-be-controlled appliance 10.

The server 50 is at a remote end and is connected to a database 52, wherein the database 52 is adapted to record the control commands received from the electronic device 40, and to store the control commands to be sent. The server 50 and the database 52 could be executed at the same server host or at different server hosts.

With the aforementioned configuration, a method for transmitting data in the wireless system of the first embodiment of the present invention could be applied, wherein the method includes the following steps.

Figure 2:
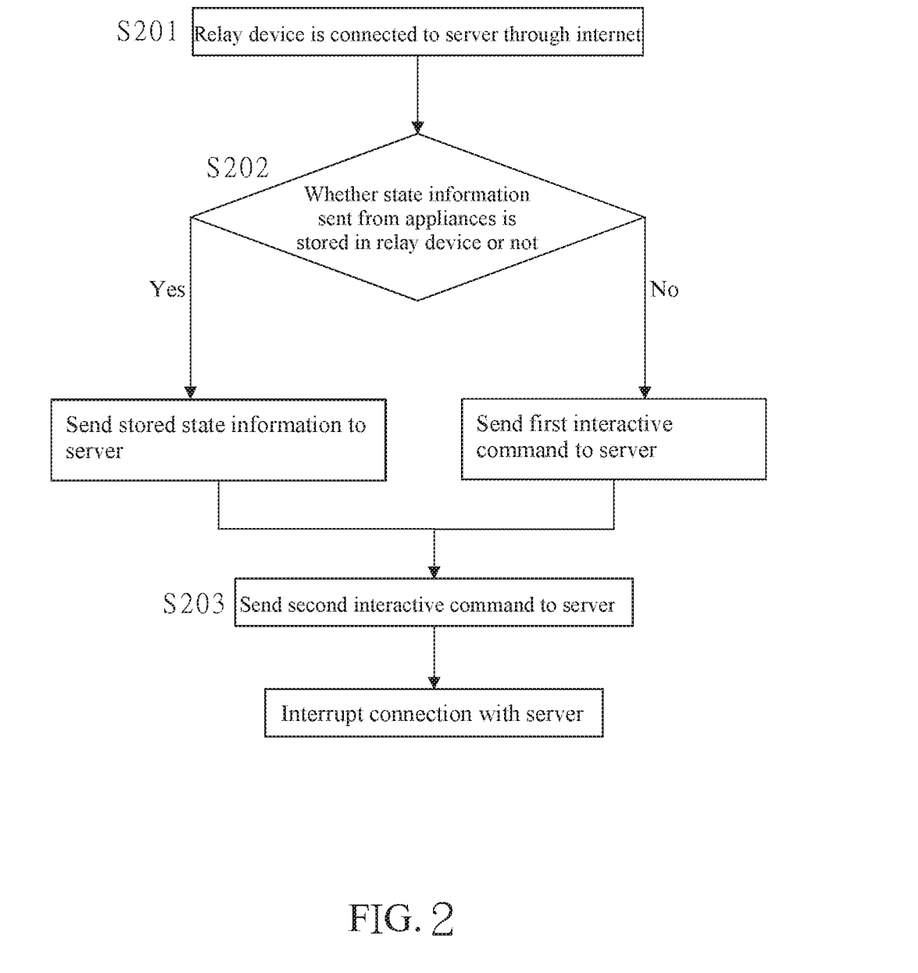
FIG. 2 is a flowchart illustrating the operation steps of the relay device according to the data transmission method of the wireless system of the first embodiment.

FIG. 2 is a flowchart of the operating procedure of the relay device 20.

In step S201, the relay device 20 is connected to the server 50 via the access point 30 through the Internet I, so that the relay device 20 and the server 50 could transmit data to each other.

In step S202, the relay device 20 determines whether there is a state information sent from any of the appliances 10 being stored or not.

If so, the stored state information is sent to the server 50 by the relay device 20.

If there is no any state information of the appliances 10 being stored, the relay device 20 sends a first interactive command to the server 50, wherein the first interactive command corresponds to a situation that there is no state information of the appliances 10 being stored in the relay device 20. In other words, the relay device 20 notices the server 50 that there is no any state information can be uploaded to server 50.

In step S203, after the relay device 20 sending the state information or the first interactive command, the relay device 20 sends a second interactive command (i.e., a request interrupt instruction) to the server 50, and then interrupts the connection with the server 50, wherein the second interactive command requests the server 50 to interrupt the connection between the server 50 and the relay device 20. In the current embodiment, the connection between the server 50 and the relay device 20 is interrupted by the relay device 20 after the second interactive command being sent for a predetermined time, wherein the predetermined time is more than 1 second. The predetermined time could avoid that a channel between the server 50 and the relay device 20 is closed before the second interactive command is sent to the server 50, which may cause that the server 50 cannot receive the second interactive command. In other words, the predetermined time could ensure that the second interactive command could be sent to the server 50 successfully.

Figure 3:
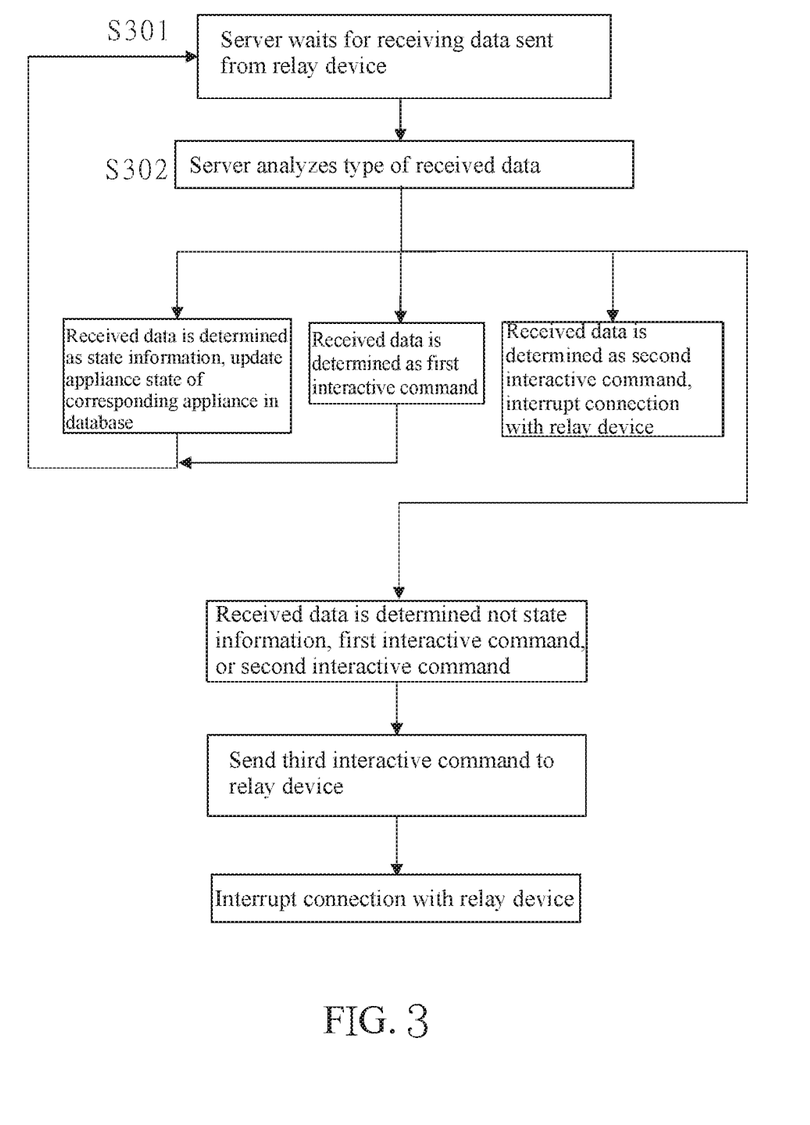
FIG. 3 is a flowchart illustrating the operation steps of the server according to the data transmission method of the wireless system of the first embodiment.

FIG. 3 is a flowchart of the operating procedures of the server 50.

Step S301 follows step S201, wherein in step S301, the server 50 waits for receiving data sent from the relay device 20.

In step S302, once the server 50 receives the data sent from the relay device 20, the server 50 analyzes the type of the received data.

If the received data is the state information of the appliances 10, the server 50 stores the received state information in the database 52, and updates an appliance state of the corresponding appliance 10 in the database 52, and sends the corresponding appliance state to the electronic device 40. Then, returning to step S301, the server 50 keeps waiting for receiving data sent from the relay device 20.

If the received data is the first interactive command, then returning to step S301, the server 50 keeps waiting for receiving data sent from the relay device 20.

If the received data is the second interactive command (i.e., the data is transmitted successfully), the server 50 closes the channel between the relay device 20 and the server 50, whereby to interrupt the connection between the server 50 and the relay device 20, and the server 50 waits for a connection of other relay devices 20 or the relay device 20 once again. In this way, the connection resource of the server 50 is released, so that when the wireless system includes a plurality of relay devices 20, the server 50 could be connected to others relay devices 20 without being exclusively occupied by the relay devices 20 which is originally connected.

If the server 50 determines that the received data is not one of the state information of the appliances 10, the first interactive command, or the second interactive command, it represents that the data format of the received data is not satisfied (i.e., the data is lost in the transmission process), and the server 50 sends a third interactive command (i.e., a request interrupt instruction) to the relay device 20, and interrupts the connection with the relay device 20, wherein the third interactive command requests the relay device 20 to interrupt the connection between the server 50 and the relay device 20. In the current embodiment, the connection of the channel between the server 50 and the relay device 20 is interrupted by the server 50 after the third interactive command being sent for a predetermined time, wherein the predetermined time is more than 1 second. The predetermined time could avoid that the channel between the server 50 and the relay device 20 is closed by the relay device 20 before the third interactive command is sent to the relay device 20, which may cause that the relay device 20 cannot receive the third interactive command. In other words, the predetermined time could ensure that the third interactive command is sent to the relay device 20 successfully. Once the relay device 20 receives the third interactive command, returning to step S201, the relay device 20 is connected to the server 50 through the Internet I.

A wireless system of a second embodiment of the present invention is based on that of the first embodiment, wherein the method has almost the same steps as said method of the first embodiment, except that step S302 in the current embodiment further includes that when the server 50 determines that the data sent from the relay device 20 is either the state information or the first interactive command, the server 50 determines whether there is a to-be-sent control command of any of the appliances 10 being stored in the database 52 or not.

If so, the server 50 sends the control command being stored in the database 52 to the relay device 20. After the relay device 20 receiving the control command, the relay device 20 sends the control command to the corresponding appliance 10, and the appliance 10 performs the corresponding action.

If the database 52 has no control command of any of the appliances 10 being stored therein, the server 50 sends a fourth interactive command to the relay device 20, wherein the fourth interactive command corresponds to a situation that there is no to-be-sent control command of any of the appliances 10 being stored in the database 52.

In the aforementioned paragraphs, the control command and the fourth interactive command could be sent before or after step S301.

In the aforementioned embodiments, once the relay device 20 sends out the state information or the first interactive command in step S202, take step S203. In this way, the relay device 20 communicates with the server 50 no matter there is a state information being stored in the memory or not. Whereby, the server 50 could determine whether the relay device 20 is abnormal (e.g. the connected relay device 20 does not send any data or the data format of the data does not satisfy), ensuring the reliability of data transmission. Certainly, step S202 could be taken at least one time. Alternatively, the relay device 20 sends the state information or the first interactive command many times before taking step S203.

Figure 4:
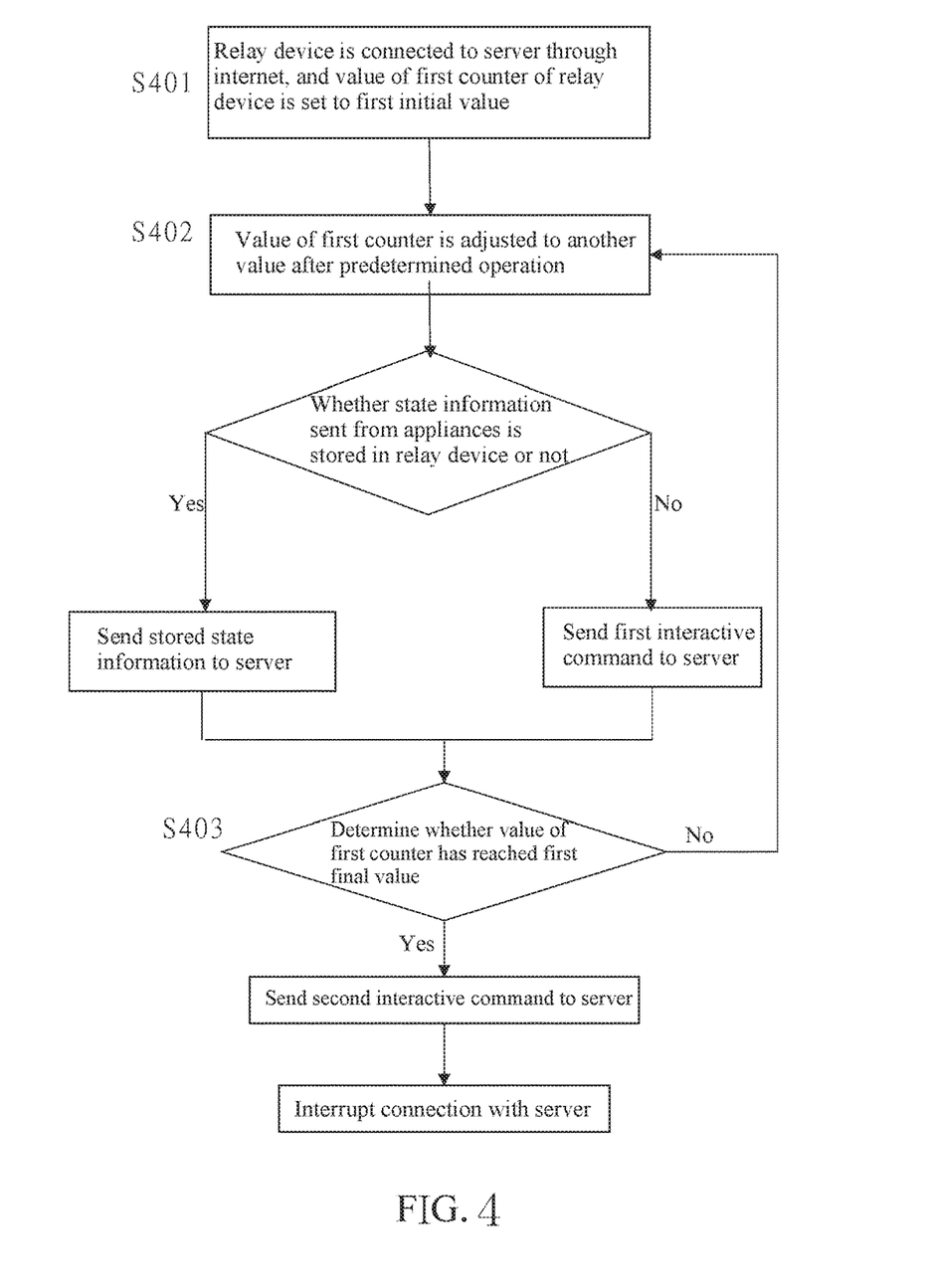
FIG. 4 is a flowchart of the method for transmitting data in the wireless system of a third embodiment of the present invention.

A method for transmitting data in a wireless system of a third embodiment is illustrated in FIG. 4, wherein the method has almost the same steps as said method of the first embodiment.

The difference between the method of the first embodiment and that of the third embodiment is that, step S401 includes that a value of the first counter 202 of the relay device 20 is set to a first initial value. In the current embodiment, the first initial value is 0.

Step S402 includes that the value of the first counter 202 is adjusted to another value after a predetermined operation. In the current embodiment, the value of the first counter 202 is added with a first predetermined value, wherein the first predetermined value is 1 as an example. Certainly, the predetermined operation could be subtraction, for instance, the value of the first counter 202 minus the first predetermined value.

Step S403 includes that determine whether the value of the first counter 202 has reached a first final value.

If so, send the second interactive command to the server 50, and interrupt the connection with the server 50. In the current embodiment, the connection between the server 50 and the relay device 20 is interrupted by the relay device 20 after the second interactive command being sent for a predetermined time, wherein the predetermined time is more than 1 second.

Otherwise, returning to step S402.

In the current embodiment, the first final value is 20 as an example. In other words, the state information or the first interactive command is sent 20 times when the relay device 20 is connected to the server 50, unless the data received by the server 50 is not the state information of the appliances 10, the first interactive command, or the second interactive command, just like step S302 of the first embodiment. At such a situation, the number of transmissions will be interrupted prematurely.

In this way, the state information or the first interactive command could be transmitted many times when the relay device 20 is connected to the server 50. Especially when the method is applied to a wireless system with multiple relay devices 20, each of the relay devices 20 could transmit at certain times when each of the relay devices 20 is connected to the server 50.

A wireless system of a fourth embodiment of the present invention is based on that of the third embodiment. The method of the fourth embodiment includes that when the relay device 20 is connected to the access point 30 after a time, the relay device 20 interrupts the connection between the access point 30 and the relay device 20, and then, the relay device 20 is connected to the access point 30 again. In the current embodiment, after the relay device 20 interrupting the connection with the access point 30, the relay device 20 restarts first, and is connected to the access point 30 then. In this way, the connection between the relay device 20 and the access point 30 could be more stable, whereby to avoid data loss.

Figure 5A:
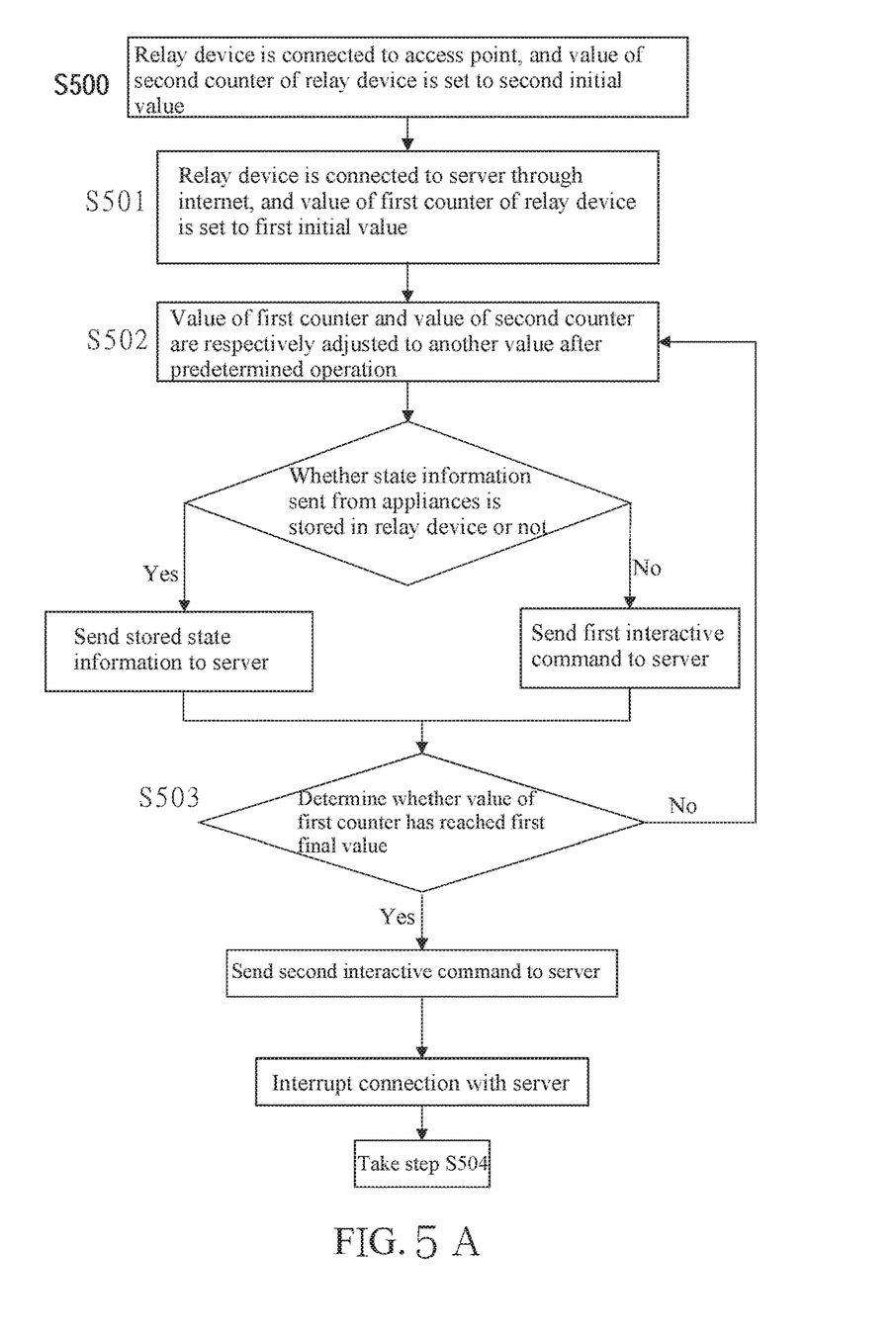
FIG. 5A and FIG. 5B are flowcharts of the method for transmitting data in the wireless system of a fifth embodiment of the present invention.
Figure 5B:
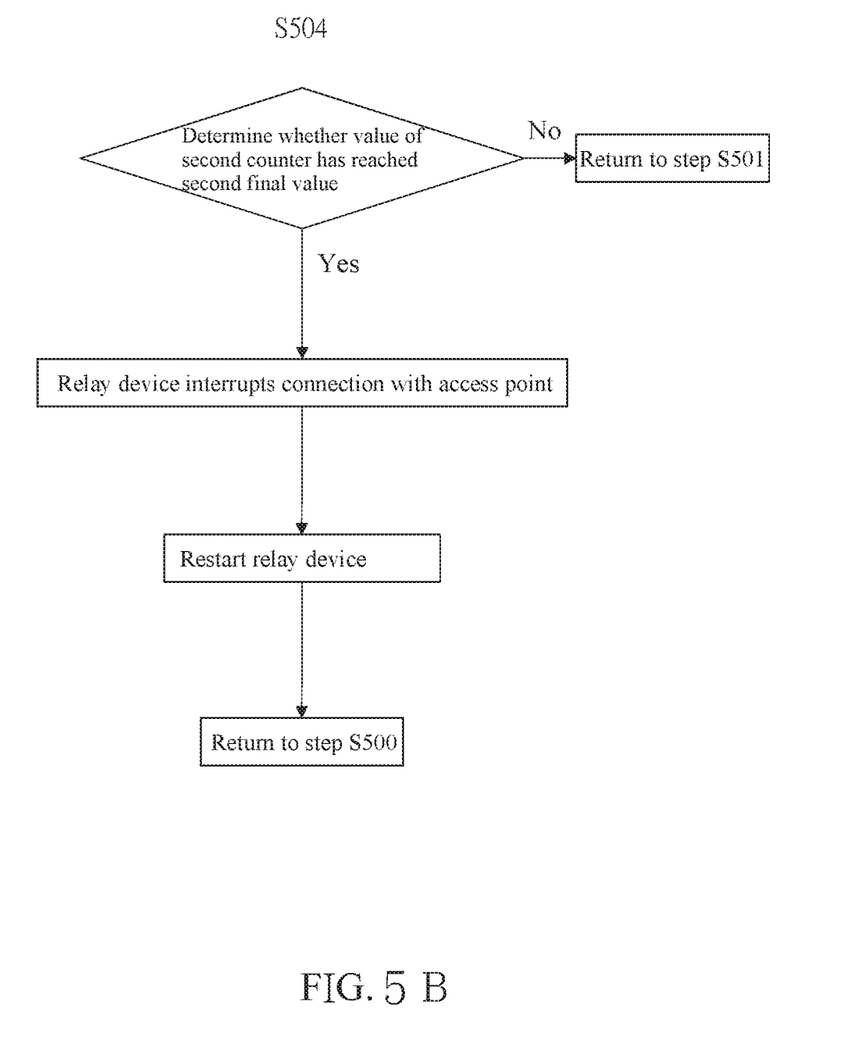

A method for transmitting data in a wireless system of a fifth embodiment is illustrated in FIG. 5A and FIG. 5B, wherein the method has almost the same steps as said method of the third embodiment.

The difference between the method of the third embodiment and that of the fifth embodiment is that, the method of the fifth embodiment includes step S500 before step S501. In step S500, the relay device 20 is connected to the access point 30, and a value of the second counter 204 is set to a second initial value. In the current embodiment, the second initial value is 0.

In step S502, the value of the first counter 202 is adjusted to another value. Besides, step S502 further includes that the value of the second counter 204 is adjusted to another value after a predetermined operation. In the current embodiment, the value of the second counter 204 is added with a second predetermined value, wherein the second predetermined value is 1 as an example. Certainly, the predetermined operation could be subtraction, for instance, the value of the second counter 204 minus the second predetermined value.

In addition, the method of the fifth embodiment further includes step S504 (as shown in FIG. 5B) after the connection between the server 50 and the relay device 20 being interrupted in step S503. In step S504, the relay device 20 determines whether the value of the second counter 204 has reached a second final value.

If so, the relay device 20 interrupts the connection with the access point 30, and returning to step S500. In the current embodiment, once the connection between the access point 30 and the relay device 20 is interrupted, the relay device 20 restarts first, and then returning to step S500.

Otherwise, returning to step S501.

In the current embodiment, after the relay device 20 being connected to the access point 30 for a period of time, the relay device 20 could also be connected to the access point 30 again. Whereby, the connection between the relay device 20 and the access point 30 could be more stable.

Figure 6:
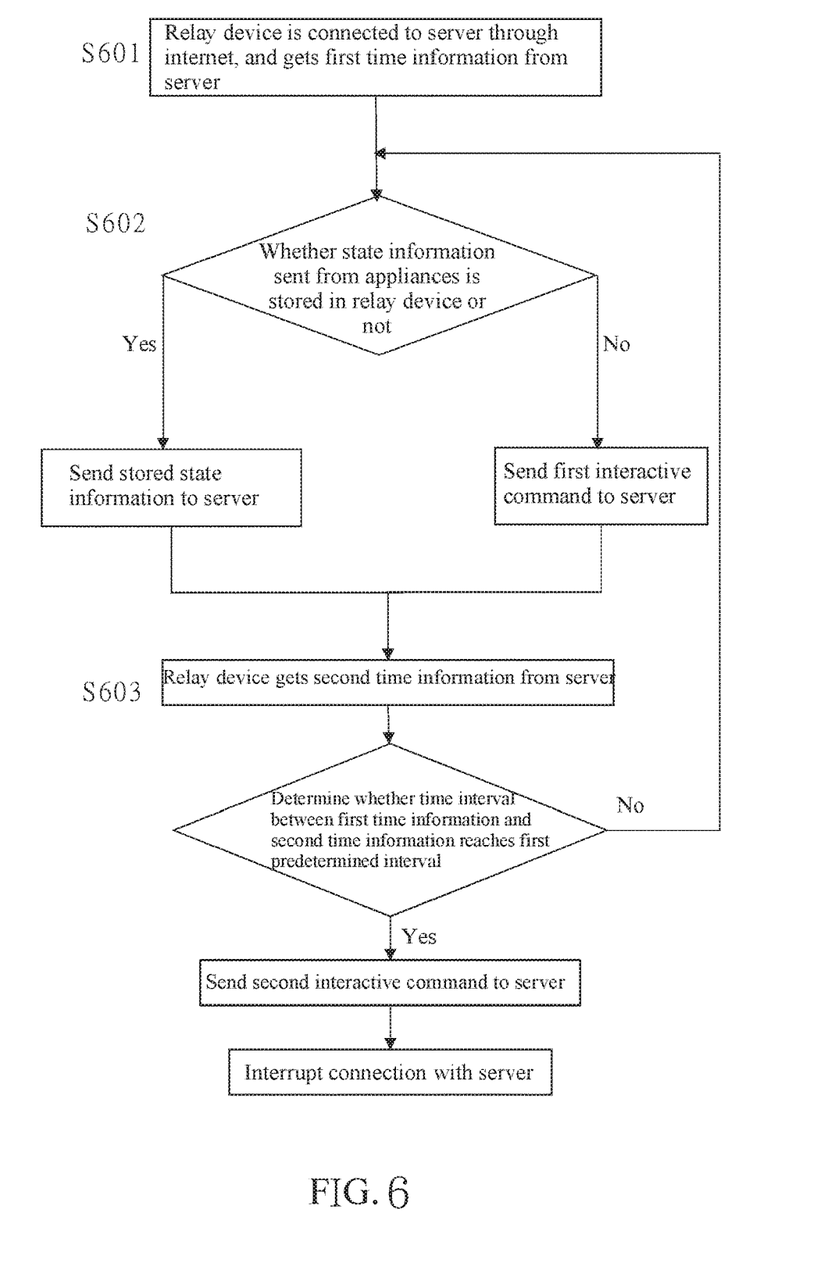
FIG. 6 is a flowchart of the method for transmitting data in the wireless system of a sixth embodiment of the present invention.

A method for transmitting data in a wireless system of a sixth embodiment is illustrated in FIG. 6, wherein the method has almost the same steps as said method of the first embodiment.

The difference between the method of the sixth embodiment and that of the first embodiment is that, step S601 includes that the relay device 20 gets a first time information from the server 50. More specifically, the relay device 20 sends a time request command to the server 50. When the server 50 receives the time request command, the server 50 sends the first time information to the relay device 20, wherein the first time information includes a current system time of the server 50.

Step S603 includes that the relay device 20 sends the time request command to the server 50, so as to get a second time information from the server 50, wherein the second time information includes a current system time of the server 50. The relay device 20 determines whether the time interval between the first time information and the second time information reaches a first predetermined interval or not.

If so, send the second interactive command to the server 50, and then interrupt the connection with the server 50. In the current embodiment, the connection between the server 50 and the relay device 20 is interrupted by the relay device 20 after the second interactive command being sent for a predetermined time, wherein the predetermined time is more than 1 second.

Otherwise, returning to step S602.

In the current embodiment, after the relay device 20 being connected to the server 50, the state information or the first interactive command would be transmitted many times in a period corresponding to the first predetermined interval. Unless the data received by the server 50 in step S302 is not one of the state information of the appliances 10, the first interactive command, or the second interactive command. At such a situation, the number of transmissions will be interrupted prematurely. In this way, the state information or the first interactive command could be transmitted many times when the relay device 20 is connected to the server 50. Especially when the method is applied to a wireless system with multiple relay devices 20, each of the relay devices 20 could transmit at certain times when each of the relay devices 20 is connected to the server 50.

In the current embodiment, when the relay device 20 is connected to the access point 30 after a time, the relay device 20 interrupts the connection between the access point 30 and the relay device 20. After the relay device 20 interrupting the connection with the access point 30, the relay device 20 restarts first, and is connected to the access point 30 then. In this way, the connection between the relay device 20 and the access point 30 could be more stable, whereby to avoid data loss, just like the fourth embodiment.

Figure 7A:
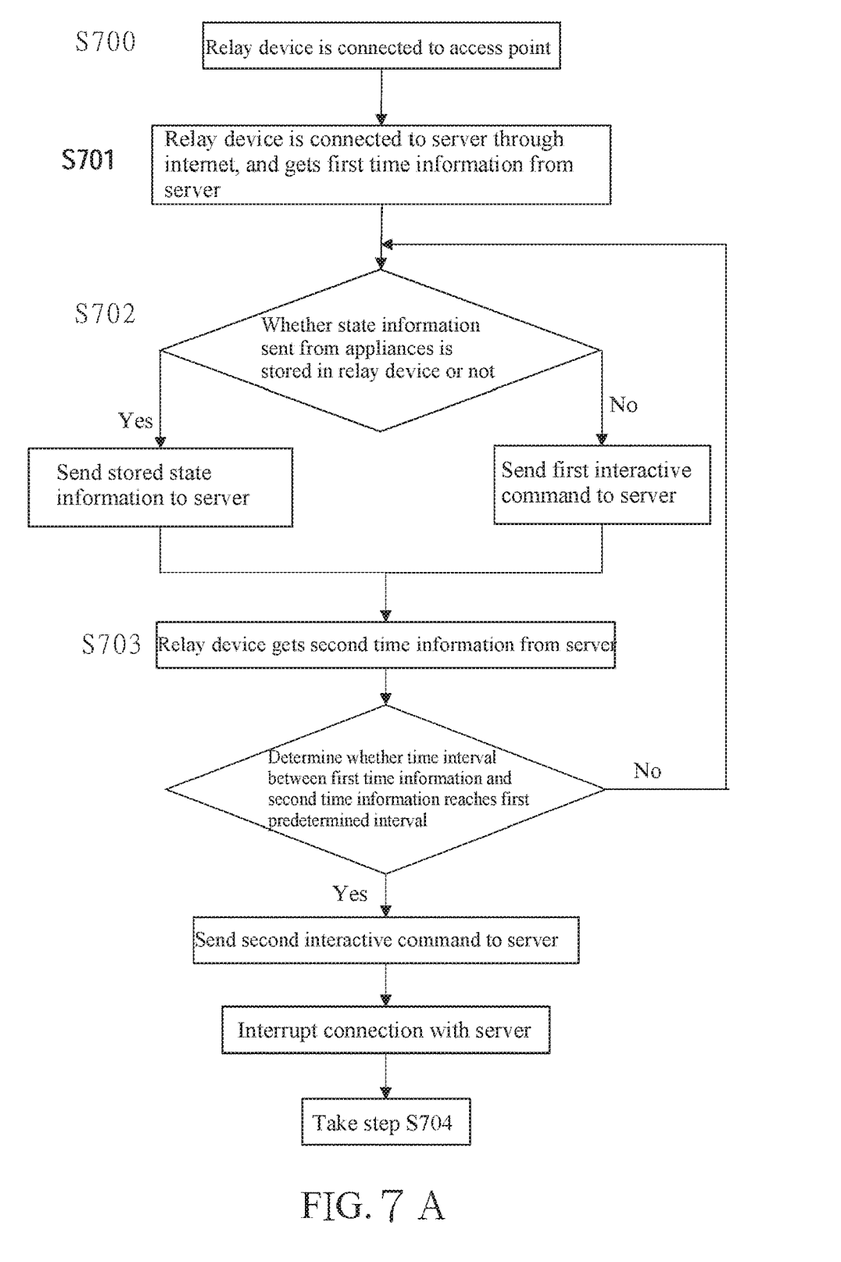
FIG. 7A and FIG. 7B are flowcharts of the method for transmitting data in the wireless system of a seventh embodiment of the present invention.
Figure 7B:
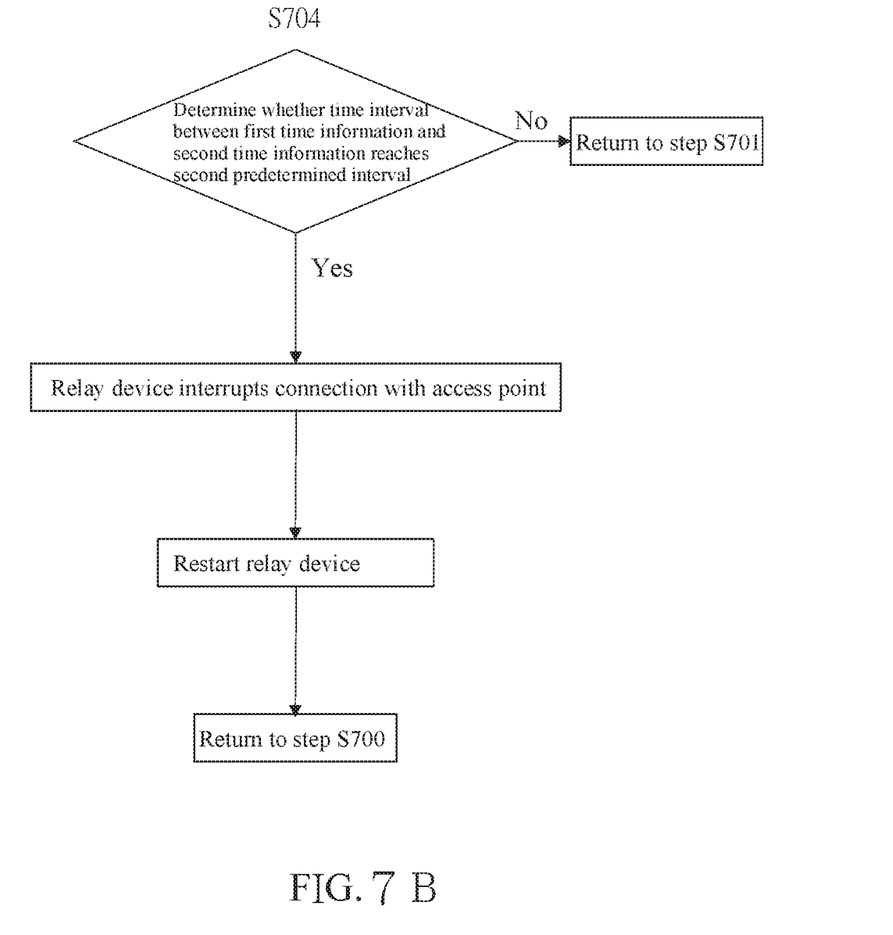

A method for transmitting data in a wireless system of a seventh embodiment is illustrated in FIG. 7A and FIG. 7B, wherein the method has almost the same steps as said method of the sixth embodiment.

The difference between the method of the seventh embodiment and that of the sixth embodiment is that, the method of the seventh embodiment includes step S700 before step S701, step S700 includes that the relay device 20 is connected to the access point 30.

Step S703 follows step S702. The method of the seventh embodiment further includes step S704 (as shown in FIG. 7B) after the connection between the server 50 and the relay device 20 being interrupted in step S703. In step S704, the relay device 20 determines whether the time interval between the first time information and the second time information reaches a second predetermined interval.

If so, the connection with the access point 30 is interrupted by the relay device 20, and returning to step S700. In the current embodiment, once the connection with the access point 30 is interrupted, the relay device 20 restarts first, and then returning to step S700.

Otherwise, returning to step S701.

In the current embodiment, when the relay device 20 is connected to the access point 30 for a period of time, the relay device 20 could also be connected to the access point 30 again. Whereby, the connection between the relay device 20 and the access point 30 could be more stable.

In summary, the relay device 20 of the present invention could send the first interactive command to the server 50 even there is no state information being stored in the memory. In this way, the server 50 could determine whether the relay device 20 transmits data normally or not, ensuring the reliability of data transmission.

It must be pointed out that the embodiments described above are only some preferred embodiments of the present invention. All equivalent methods which employ the concepts disclosed in this specification and the appended claims should fall within the scope of the present invention.

What is claimed is:

1. A method for transmitting data in a wireless system, wherein the wireless system comprises a server, a relay device, and at least one appliance, wherein the server and the relay device are connected to an internet respectively; the relay device is wirelessly connected to the at least one appliance, and is adapted to receive and store a state information of the at least one appliance; the method comprising the steps of:

A. connecting to the server by the relay device through the internet, which is adapted for the relay device and the server to transmit data to each other;

B. determining with the relay device whether the relay device is stored with the state information sent from the at least one appliance;

if the relay device stores the state information sent from the at least one appliance, then sending the state information to the server by the relay device;

otherwise, sending a first interactive command to the server by the relay device, wherein the first interactive command corresponds to a situation that the relay device is not stored with any state information of the at least one appliance; and C. sending a second interactive command to the server with the relay device, and then interrupting a connection between the relay device and the server, wherein the second interactive command requests the server to interrupt the connection with the relay device.

2. The method of claim 1, wherein step A further comprises setting a value of a first counter of the relay device to a first initial value; in step B, the value of the first counter is adjusted to another value by a predetermined operation; in step C, determining whether the value of the first counter has reached a first final value; if the value of the first counter has reached the first final value, then sending the second interactive command to the server, and then interrupting the connection with the server; otherwise, repeating step B.

3. The method of claim 2, wherein, in step C, the connection between the relay device and the server is interrupted after the second interactive command being sent for a predetermined time.

4. The method of claim 2, wherein the wireless system further comprises an access point connected to the internet;

the access point is adapted to be connected by the relay device via a Wi-Fi signal; the method further comprises the steps that when the relay device is connected to the access point after a period of time, the relay device interrupts the connection with the access point, and then, connecting to the access point again by the relay device.

5. The method of claim 2, wherein the wireless system further comprises an access point connected to the internet; the access point is adapted to be connected by the relay device via a Wi-Fi signal; the method further comprises the steps that connecting to the access point by the relay device, and a value of a second counter is set to a second initial value before step A; step B further comprises that the value of the second counter is adjusted to another value by a predetermined operation; the method further comprises the steps that determining whether the value of the second counter has reached a second final value after step C; once the value of the second counter has reached a second final value, the relay device interrupts the connection with the access point, and then repeating the steps before step A, connecting to the access point again by the relay device, and setting the value of the second counter to the second initial value.

6. The method of claim 5, wherein in the steps after step C, once the connection with the access point is interrupted by the relay device, the relay device restarts first, and then repeating the steps before step A, connecting to the access point again by the relay device, and setting the value of the second counter to the second initial value.

7. The method of claim 5, wherein the steps after step C further comprises that when the value of the second counter is determined that does not reach the second final value, repeating step B.

8. The method of claim 1, wherein step A further comprises that the relay device gets a first time information from the server; step C further comprises that the relay device gets a second time information from the server, and determining whether a time interval between the first time information and the second time information reaches a first predetermined interval or not; if the time interval between the first time information and the second time information reaches a first predetermined interval, then sending the second interactive command to the server, and then interrupting the connection with the server; otherwise, repeating step B.

9. The method of claim 8, wherein, in step C, the connection with the server is interrupted after the second interactive command being sent for a predetermined time.

10. The method of claim 8, wherein the wireless system further comprises an access point connected to the internet; the access point is adapted to be connected by the relay device via a Wi-Fi signal; the method further comprises the steps that when the relay device is connected to the access point after a period of time, the relay device interrupts a connection with the access point, and then, connecting to the access point again by the relay device.

11. The method of claim 8, wherein the wireless system further comprises an access point connected to the internet; the access point is adapted to be connected by the relay device via a Wi-Fi signal; the method further comprises the steps that connecting to the access point by the relay device before step A; the method further comprises the steps that determining whether a time interval between the first time information and the second time information reaches a second predetermined interval; once the second time information reaches the second predetermined interval, the connection with the access point is interrupted by the relay device, and then repeating steps before step A, connecting to the access point again by the relay device.

12. The method of claim 11, wherein in the steps after step C, once the connection with the access point is interrupted by the relay device, the relay device restarts first, and then repeating the steps before step A, connecting to the access point again by the relay device.

13. The method of claim 1, wherein after step B, the method further comprises the steps that when the server determines a data sent from the relay device is not one of the state information of the at least one appliance, the first interactive command, or the second interactive command, sending a third interactive command to the relay device, and then interrupting the connection with the relay device, wherein the third interactive command requests the relay device to interrupt the connection with the server.

14. The method of claim 13, wherein after step B, the method further comprises the steps that when the relay device receives the third interactive command, repeating step A.

15. The method of claim 13, wherein after step B, the method further comprises the steps that the connection with the relay device is interrupted by the server after the third interactive command is sent for a predetermined time.

16. The method of claim 1, wherein the relay device is adapted to transmit a control command to the at least one appliance; wherein after step B, the method further comprises the steps that when the server determines a data sent from the relay device is either the state information or the first interactive command, the server determines whether there is a control command, which is to be sent to the at least one appliance, is stored;
    if there is a control command to be sent to the at least one appliance stored, then sending the stored control command to the relay device;
    otherwise, sending a fourth interactive command to the relay device, wherein the fourth interactive command there is no control command which is to be sent to the at least one appliance being stored.

* * * * *